(12) United States Patent
Choi et al.

(10) Patent No.: US 8,520,961 B2
(45) Date of Patent: *Aug. 27, 2013

(54) METHOD AND APPARATUS FOR ENCODING AND DECODING MULTI-VIEW IMAGE

(75) Inventors: Jong-bum Choi, Yangju-si (KR); Woo-sung Shim, Yongin-si (KR); Hak-sup Song, Suwon-si (KR); Young-ho Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/353,039

(22) Filed: Jan. 18, 2012

(65) Prior Publication Data

US 2012/0114259 A1    May 10, 2012

Related U.S. Application Data

(63) Continuation of application No. 11/872,236, filed on Oct. 15, 2007, now Pat. No. 8,121,425.

(60) Provisional application No. 60/851,315, filed on Oct. 13, 2006, provisional application No. 60/853,449, filed on Oct. 23, 2006.

(30) Foreign Application Priority Data

Mar. 14, 2007    (KR) .................. 10-2007-0025138

(51) Int. Cl.
*G06K 9/36*    (2006.01)
*G06K 9/46*    (2006.01)

(52) U.S. Cl.
USPC ........................................ 382/238

(58) Field of Classification Search
USPC .... 382/173, 232, 233, 236, 238; 375/240.01, 375/240.08, 240.1, 240.12, 240.13, 240.16, 375/240.24, 240.29, E7.076, E7.193; 348/42, 348/43, 47, 48, 211.11, 563–565, E13.014, 348/E13.015
See application file for complete search history.

(56) References Cited

U.S. PATENT DOCUMENTS 5,790,206 A    8/1998    Ju
5,991,443 A    11/1999    Gallery et al.
(Continued)

FOREIGN PATENT DOCUMENTS

JP    698312 A    4/1994
JP    07-143494 A    6/1995
(Continued)

OTHER PUBLICATIONS

Artigas, Xavi et al.: "Side Information Generation for Multiview Distributed Video Coding Using a Fusion Approach". Signal Processing Symposium. NORSIG 2006. Proceedings of the 7th Nordic IEEE. Jun. 1, 2006. pp. 250-253.

(Continued)

*Primary Examiner* — Amir Alavi
(74) *Attorney, Agent, or Firm* — Sughrue Mion, PLLC

(57) ABSTRACT

Provided is a method and apparatus for encoding and decoding a multiview image. By predicting a current picture based on at least one of an intra (I) picture of a previous image processing block and an I picture of a current image processing block, which is generated for a different view than a view at which the I picture of the previous image processing block is generated, and encoding the current picture based on the prediction, it is possible to prevent display quality degradation that may occur in images at views other than a base view.

19 Claims, 11 Drawing Sheets

(56) References Cited

U.S. PATENT DOCUMENTS

| | | | |
|---|---|---|---|
| 6,055,274 | A | 4/2000 | McVeigh |
| 6,999,513 | B2 | 2/2006 | Sohn et al. |
| 7,012,936 | B2 | 3/2006 | Kawada et al. |
| 7,012,963 | B2 | 3/2006 | Zdepski et al. |
| 7,050,500 | B2 | 5/2006 | Sun et al. |
| 7,826,530 | B2 | 11/2010 | Mohsenian |
| 8,121,425 | B2 * | 2/2012 | Choi et al. ............. 382/238 |
| 2003/0202592 | A1 | 10/2003 | Sohn et al. |
| 2005/0129128 | A1 | 6/2005 | Chou et al. |
| 2006/0022079 | A1 | 2/2006 | Koide et al. |
| 2006/0146138 | A1 | 7/2006 | Xin et al. |
| 2006/0222079 | A1 | 10/2006 | Park et al. |
| 2006/0262856 | A1 | 11/2006 | Wu et al. |
| 2007/0030356 | A1 | 2/2007 | Yea et al. |
| 2007/0041443 | A1 | 2/2007 | Ha et al. |
| 2007/0064799 | A1 | 3/2007 | Ha |
| 2007/0103558 | A1 | 5/2007 | Cai et al. |
| 2007/0121722 | A1 | 5/2007 | Martinian et al. |
| 2007/0183495 | A1 * | 8/2007 | Kim ..................... 375/240.1 |
| 2008/0089596 | A1 | 4/2008 | Choi et al. |
| 2008/0095234 | A1 | 4/2008 | Wang et al. |
| 2008/0130738 | A1 | 6/2008 | Lee et al. |
| 2008/0159638 | A1 * | 7/2008 | Song et al. ............. 382/233 |
| 2008/0240590 | A1 * | 10/2008 | Moon et al. ............. 382/236 |
| 2008/0253671 | A1 * | 10/2008 | Choi et al. ............. 382/238 |
| 2008/0285863 | A1 * | 11/2008 | Moon et al. ............. 382/232 |
| 2008/0317361 | A1 * | 12/2008 | Song et al. ............. 382/233 |
| 2009/0028249 | A1 * | 1/2009 | Gomila et al. .......... 375/240.29 |
| 2009/0103619 | A1 | 4/2009 | Sohn et al. |
| 2009/0279608 | A1 | 11/2009 | Jeon et al. |
| 2009/0296811 | A1 | 12/2009 | Jeon et al. |
| 2009/0310676 | A1 | 12/2009 | Yang |
| 2010/0111170 | A1 | 5/2010 | Koo et al. |
| 2010/0118942 | A1 | 5/2010 | Pandit et al. |
| 2010/0200252 | A1 | 8/2010 | Naylor et al. |
| 2010/0215100 | A1 | 8/2010 | Jeon et al. |
| 2010/0232510 | A1 | 9/2010 | Ho et al. |
| 2012/0114259 | A1 * | 5/2012 | Choi et al. ............. 382/233 |
| 2012/0148166 | A1 * | 6/2012 | Choi et al. ............. 382/233 |
| 2012/0148167 | A1 * | 6/2012 | Choi et al. ............. 382/233 |
| 2012/0148168 | A1 * | 6/2012 | Choi et al. ............. 382/233 |
| 2012/0148169 | A1 * | 6/2012 | Choi et al. ............. 382/233 |
| 2012/0148170 | A1 * | 6/2012 | Choi et al. ............. 382/238 |
| 2012/0155782 | A1 * | 6/2012 | Choi et al. ............. 382/238 |
| 2012/0201474 | A1 * | 8/2012 | Song et al. ............. 382/233 |
| 2012/0213282 | A1 * | 8/2012 | Choi et al. ............. 375/240.16 |

FOREIGN PATENT DOCUMENTS

| | | | |
|---|---|---|---|
| JP | 09261653 | | 10/1997 |
| JP | 9275578 | A | 10/1997 |
| JP | 200136908 | A | 2/2001 |
| JP | 2002354503 | A | 12/2002 |
| JP | 2005244503 | A | 9/2005 |
| JP | 2008503973 | A | 2/2008 |
| KR | 10-2005-0122717 | A | 12/2005 |
| KR | 10-2006-0065553 | A | 6/2006 |
| KR | 10-2006-0083053 | A | 7/2006 |
| KR | 10/2007/0022568 | A | 2/2007 |
| KR | 10-2007-0055903 | A | 5/2007 |
| KR | 10-2007-0098429 | A | 10/2007 |
| KR | 10-2008-0007086 | A | 1/2008 |
| WO | 2006001653 | A1 | 1/2006 |
| WO | 2006062377 | A1 | 6/2006 |
| WO | 2006073116 | A1 | 7/2006 |
| WO | 2007114608 | A1 | 10/2007 |

OTHER PUBLICATIONS

Communication dated May 24, 2011, issued by the European Office in counterpart European application No. 078332988.
Communication issued May 19, 2011 by the Mexican Patent Office in counterpart Mexican application No. MX/a/2009/003888.
Kimata, Hideaki et al.: "System Design of Free Viewpoint Video Communication". The Fourth International Conference on IEEE. Los Alamitos, CA. Sep. 14, 2004. pp. 52-59.
Oh, Kwan-Jung and Yo-Sung Ho et al.: "Multi-view Video Coding based on Lattice-like Pyramid GOP Structure". 25. Picture Coding Symposium; Beijing. Apr. 24, 2006.
Communication from the Japanese Patent Office dated Jan. 17, 2012, in a counterpart application citing No. 2009-532298.
Communication dated Aug. 20, 2012, issued by the European Patent Office in counterpart European Application No. 07833298.8.
Notice of Allowance dated Nov. 18, 2010, issued in corresponding Korean application No. 10-2007-0068186.
Office Action dated Sep. 16, 2010, issued in corresponding Korean application No. 10-2007-0068186.
Chen, Y .et. al. "On MVC reference picture making", Joint Video Team (JVT) of ISO/IEC MPEG & ITU-T VCEG (ISO/ICE JTC1/SC29/WG11 and ITU-T SG16 Q. 6), 22nd Meeting: Marrakech, Morocco, Jan. 13-19, 2007, pp. 1-8.
"Series H: Audiovisual and Multimedia Systems, Infrastructure of audiovisual services—Coding of moving video", Advanced video coding for generic audiovisual services, ITU-T Telecommunication sector of ITU, Nov. 2007, 564 pages total.
Communication dated May 21, 2012 issued by the European Patent Office in counterpart European Patent Application No. 08723299.7.
Communication dated May 16, 2012 issued by the European Patent Office in counterpart European Patent Application No. 12153703.9.
Communication dated May 15, 2012 issued by the European Patent Office in counterpart European Patent Application No. 12153705.4.
Communication dated May 15, 2012 issued by the European Patent Office in counterpart European Patent Application No. 12153706.2.
Communication dated May 14, 2012 issued by the European Patent Office in counterpart European Patent Application No. 12153702.1.
Communication dated May 14, 2012 issued by the European Patent Office in counterpart European Patent Application No. 12153707.0.
Communication dated May 11, 2012 issued by the European Patent Office in counterpart European Patent Application No. 08723299.7.
Communication dated May 14, 2012 issued by the European Patent Office in counterpart European Patent Application No. 12153708.8.
Martinian, et al., "V-Picture Syntax for Random Access in Multi-view Video Compression", Mitsubishi Research Labs, Montreux, Switzerland, Apr. 2006, 8 pages total.
Wang, et al., "Comments to JMVM 1.0", Nokia Corp., and Tampere University of Tech., vol. JVT-U103, Oct. 20, 2006, pp. 1-6, XP002478605.
Chen, et al., "MVC Reference Picture Management", Tampere University of Tech., and Nokia Corp., Oct. 20, 2006, pp. 1-9.
Communication dated May 15, 2012 issued by the Japanese Patent Office in counterpart Japanese Patent Application No. 2010-502926.
Communication dated May 22, 2012 issued by the Mexican Intellectual Property Office in counterpart Mexican Patent Application No. MX/a/2009/010933.
Communication, dated Aug. 9, 2012, issued by the Korean Intellectual Property Office in counterpart Korean Application No. 10-2010-0103141.
Weigand, T., et al., "Meeting Report, Draft 7", Joint Video Team (JVT) of ISO/IEC MPEG & ITU-T VCEG (ISO/IEC JTC1/SC29/WG11 and ITU-T SG16 Q.6), 2006, pp. 1-82, XP 007911080.
Koo, H.-S., et al., "Motion Skip Mode for MVC", Joint Video Team (JVT) of ISO/IEC MPEG & ITU-T VCEG (ISO/IEC JTC1/SC29/WG11 and ITU-T SG16 Q.6), 2006, pp. 1-7, XP 030006737.
Izquierdo, M. E., et al., "Stereo image analysis for multi-viewpoint telepresence applications", Single Processing: Image Communication, 1998, pp. 231-254, vol. 11, No. 3, XP 004107305.
Song, H.-S., et al., "Macroblock Information Skip for MVC", Joint Video Team (JVT) of ISO/IEC MPEG & ITU-T VCEG (ISO/IEC JTC1/SC29/WG11 and ITU-T SG16 Q.6), 2007, pp. 1-7, XP 030006860.
Yang, H., et al., "Regional Disparity Est/Comp for MVC", Joint Video Team (JVT) of ISO/IEC MPEG & ITU-T VCEG (ISO/IEC JTC1/SC29/WG11 and ITU-T SG16 Q.6), 2006, pp. 1-16, XP 030006693.
Ho, Y.-S., et al., "Global Disparity Compensation for Multi-view Video Coding", Joint Video Team (JVT) of ISO/IEC MPEG & ITU-T VCEG (ISO/IEC JTC1/SC29/WG11 and ITU-T SG16 Q.6), 2006, pp. 1-16, XP 030006746.

Office Action issued Apr. 8, 2011, in Chinese Application No. 200880001732.5.
Chinese Office Action issued on Oct. 19, 2011 in counterpart Chinese Application No. 200880001732.5.
Communication dated Feb. 13, 2008 issued in counterpart Korean Application No. 10-2007-0033781.
Communication dated Sep. 4, 2012 issued by the Japanese Patent Office in counterpart Japanese Application No. 2009-544792.
Communication dated Dec. 11, 2012 from the European Patent Office in counterpart European application No. 07833298.8.
Vetro et al., Joint Multiview Video Model (JMVM) 1.0, Joint Video Team of ISO/IEC MPEG & ITU-T VCEG, Aug. 16, 2006, pp. 1-23.
Communication dated Dec. 25, 2012 from the Japanese Patent Office in counterpart application No. 2009-532298.
Communication dated Apr. 29, 2013 issued by the Korean Intellectual Property Office in counterpart Korean Patent Application No. 10-2007-0025138.

* cited by examiner

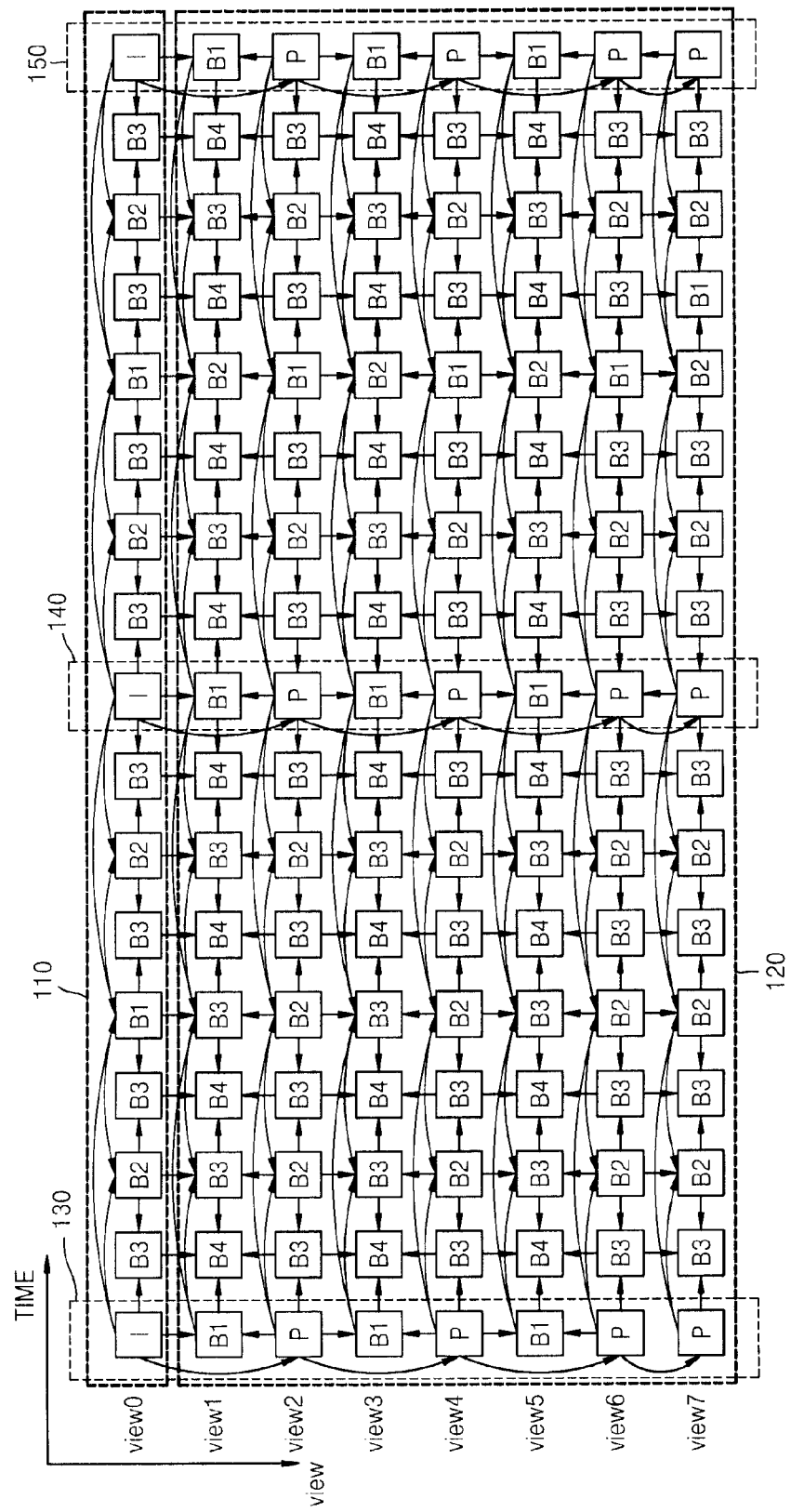
FIG. 1 <RELATED ART>

FIG. 2 <RELATED ART>

```
seq_parameter_set_mvc_extension( ) {
    num_views_minus_1
    for(i = 0; i <= num_views_minus_1; i++) {
        num_multiview_refs_for_list0[i]
        num_multiview_refs_for_list1[i]
        for( j = 0; j <num_multiview_refs_for_list0; j++ ) {
            anchor_reference_view_for_list_0[i][j]
            non_anchor_reference_view_for_list_0[i][j]
        }
        for( j = 0; j < num_multiview_refs_for_list1; j++ ) {
            anchor_reference_view_for_list_1[i][j]
            non_anchor_reference_view_for_list_1[i][j]
        }
    }
```

FIG. 6

```
slice_layer_in_svc_mvc_extension_rbsp( ) {
    if(svc_mvc_flag == 1) {
        if(view_level == 0) {
            view_id
            I_frame_position
            anchor_pic_flag
        } else {
            slice_header( )
        }
    } else {
        if ( dependency_id= =0&& quality_level= =0 ) {
            if ( nal_ref_idc!=0 ) {
                key_pic_flag
                if ( key_pic_flag&&nal_unit_type!=21 )
                    dec_ref_pic_marking_base( )
            }
        } else {
            slice_header_in_scalable_extension( )
            if( slice_type!=PR )
                slice_data_in_scalable_extension( )
            else {
                if( fragmented_flag= =1 ) {
                    if( fragment_order= =0 )
                        NumBytesInPRF = 0
                    while( entropy_coding_mode_flag && ! byte_aligned( ) )
                        cabac_alignment_one_bit
                        if ( fragment_order ! = 0 ) {
                            while(rbtmp_byte[ NumBytesInPRF ]= =0x00
                                NumBytesInPRF--
                            NumBytesInPRF--
                        }
                        while( more_rbsp_trailing_data( ) )
                            rbtmp_byte[ NumBytesInPRF++ ]
                        if( next_nalu_not_belongs_to_current_PRF( ) )
                            swap_buffers( rbtmp_byte, rbsp_byte )
                }
                if ( fragmented_flag = = 0||
                    next_nalu_not_belongs_to_current_PRF ( ) )
progressive_refinement_slice_data_in_scalable_extension( )
            }
            if ( fragmented_flag = = 0||
                    next_nalu_not_belongs_to_current_PRF ( ) )
                rbsp_slice_trailing_bits( )
        }
    }
}
```

FIG. 8A
```
seq_parameter_set_mvc_extension(?) {
 num_views_minus_1
 flexible_I_frame_position_flag
 num_diff_view_idc
 for (i=0; i< num_inter_view_prediction_index) {
  diff_view_idc[i]
 }
 if (flexible_I_frame_position==0){
  for(i=0; i <= num_views_minus_1; i++){
   num_diff_view_idc_multiview_refs_for_list0[i]
   num_diff_view_idc_multiview_refs_for_list1[i]
    for(j=0; j< num_multiview_refs_for_list0; j++){
     diff_view_idc_anchor_reference_for_list_0[i][j]
     diff_view_idc_non_anchor_reference_for_list_0[i][j]
    }
    for(j=0; j < num_multiview_refs_for_list1; j++){
     diff_view_idc_anchor_reference_for_list_1[i][j]
     diff_view_idc_non_anchor_reference_for_list_1[i][j]
    }
   }
  }
  else {
   for(i=0; i <= num_view_minus_1; i++){
    for(j=0; j <= num_view_minus_1; j++){
     num_diff_view_idc_multiview_anchor_refs_for_list0[i][j]
     num_diff_view_idc_multiview_non_anchor_refs_for_list0[i][j]
     num_diff_view_idc_multiview_anchor_refs_for_list1[i][j]
     num_diff_view_idc_multiview_non_anchor_refs_for_list1[i][j]
     for(k=0; k < num_multiview_anchor_refs_for_list0; k++){
      diff_view_idc_anchor_reference_for_list_0[i][j][k]
     }
     for(k=0; k < num_multiview_non_anchor_refs_for_list0; k++){
      diff_view_idc_non_anchor_reference_for_list_0[i][j][k]
     }
     for(k=0; k < num_multiview_anchor_refs_for_list1; k++){
      diff_view_idc_anchor_reference_for_list_1[i][j][k]
     }
     for(k=0; k < num_multiview_anchor_refs_for_list1; k++){
      diff_view_idc_non_anchor_reference_for_list_1[i][j][k]
     }
    }
   }
  }
}
```

| diff_view_idc[i] | 0 | 1 | 2 | 3 |
|---|---|---|---|---|
| difference of view | -2 | +2 | -1 | +1 |

METHOD AND APPARATUS FOR ENCODING AND DECODING MULTI-VIEW IMAGE

CROSS-REFERENCE TO RELATED PATENT APPLICATIONS

This application is a Continuation of U.S. application Ser. No. 11/872,236 filed Oct. 15, 2007 now U.S. Pat. No. 8,121, 425, which claims priority from U.S. Provisional Patent Application No. 60/851,315, filed on Oct. 13, 2006, U.S. Provisional Patent Application No. 60/853,449, filed on Oct. 23, 2006, in the U.S. Patent and Trademark Office and Korean Patent Application No. 10-2007-0025138, filed on Mar. 14, 2007 in the Korean Intellectual Property Office, the disclosures of which are incorporated herein in their entirety by reference.

BACKGROUND OF THE INVENTION

1. Field of the Invention

Apparatus and methods consistent with the present invention relate to encoding and decoding a multi-view image, and more particularly, to encoding and decoding a multi-view image, in which display quality degradation can be prevented for an image at any view.

2. Description of the Related Art

In multi-view image encoding, images input from a plurality of cameras that provide a multi-view image are simultaneously encoded. The multi-view image is compression encoded using temporal correlation and inter-view spatial correlation.

FIG. 1 illustrates image sequences of a multi-view image according to the related art.

In FIG. 1, a horizontal axis is a time axis and a vertical axis is a view axis. In multi-view image encoding, an intra (I) picture is periodically generated for an image at a base view and temporal prediction or inter-view prediction is performed based on generated I pictures, thereby predictive-encoding other pictures. An arrow direction indicates a direction in which reference is made for prediction.

Temporal prediction is performed using temporal correlation between images at the same view, i.e., in the same row. Inter-view prediction is performed using spatial correlation between images at the same point of time, i.e., in the same column.

In FIG. 1, each row shows an image sequence at each view for a multi-view image over time and each column shows an image sequence at views 0, 1, 2, through to 7, sequentially from top to bottom. The view 0 is a base view and an image sequence 110 in the first row is at the base view. Pictures included in the image sequence 110 at the base view are predictive-encoded using only temporal prediction without using inter-view prediction.

Each column shows multi-view images at the same point of time. Pictures included in columns 130, 140, and 150 in which an image at the base view is an I picture are referred to as anchor pictures. The anchor pictures are encoded using only inter-view prediction.

Referring to FIG. 1, I pictures periodically exist in the image sequence 110 at the base view, but no I picture exists in image sequences 120 at other views. In other words, I pictures periodically exist only in positions corresponding to anchor pictures in the image sequence 110 at the base view.

According to the related art, since image sequences 120 at views other than the base view are predictive-encoded without using an I picture, they are likely to suffer from display quality degradation when compared to the image sequence 110 at the base view. Even if spatial correlation between cameras, i.e., inter-view spatial correlation, exists, prediction is performed without using an I picture for an image at each view. As a result, prediction is likely to be inaccurately performed and thus display quality degradation is likely to occur.

FIG. 2 illustrates syntax of a sequence parameter of a multi-view image according to the related art.

First, information about the number of views of a multi-view image, i.e., 'num_views_minus_1', is set. Once 'num_views_minus_1' is set, information about the number of views that are referred to by each view for inter-view prediction, i.e., 'num_multiview_refs_for_list0[$i$]' and 'num_multiview_refs_for_list1[$i$]', is set. 'list0' is a list of reference views whose numbers are less than the current view number from among all reference views referred to by the current view, and 'list1' is a list of reference views whose numbers are greater than the current view number from among all the reference views.

Once the number of reference views referred to by each view is set, information indicating each view refers to which view is set in detail. At this time, since a view referred to by an anchor picture and a view referred to by a non-anchor picture are different from each other, the information is set separately for the anchor picture and the non-anchor picture. All parameters set in this way are encoded and then inserted into a bitstream.

As illustrated in FIG. 1, in a multi-view image, reference views referred to by pictures at each view for inter-view prediction do not change over the entire image sequence. For example, referring to FIG. 1, in an image sequence at view 2, i.e., in the third row, anchor pictures in columns in which I pictures exist are predictive (P) pictures and refer only to the view 0 and non-anchor pictures do not refer to any view. The reference view referred to by the view 2 does not change over the entire image sequence. Similarly, in an image sequence at view 3, i.e., in the fourth row, anchor pictures and non-anchor pictures refer to views 2 and 4 and the reference views referred to by the view 3 do not change over the entire image sequence.

Thus, when a reference view does not change, information about a reference view referred to by each view in a multi-view image for inter-view prediction may be set as illustrated in FIG. 2. However, when information about a reference view changes in an image sequence, it cannot be expressed properly with the syntax illustrated in FIG. 2.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for encoding and decoding a multi-view image, in which display quality degradation can be prevented for any view of the multi-view image, a method and apparatus for encoding information about reference views for inter-view prediction, and a computer-readable recording medium having recorded thereon a program for executing the methods.

According to one aspect of the present invention, there is provided a method of encoding a multi-view image. The method includes generating an intra (I) picture of a current image processing block for a different view than a view at which an I picture of a previous image processing block is generated, predicting a current picture based on at least one of the I picture of the previous image processing block and the I picture of the current image processing block, and encoding the current picture based on the prediction.

The I pictures may be anchor pictures at different times.

The predicting of the current picture may include predicting the current picture by performing temporal prediction or inter-view prediction based on at least one of the I picture of the previous image processing block and the I picture of the current image processing block.

The inter-view prediction may be performed by referring to pictures at reference views referred to by a view including the current picture for the inter-view prediction, and the reference views may be determined according to a view at which the I picture of the current image processing block is generated.

According to another aspect of the present invention, there is provided an apparatus for encoding a multi-view image. The apparatus includes an interprediction unit predicting a current picture based on at least one of an intra (I) picture of a previous image processing block and an I picture of a current image processing block, which is generated for a different view than a view at which the I picture of the previous image processing block is generated, and an encoding unit encoding the current picture based on the prediction.

The encoding unit may encode information about the view at which the I picture of the current image processing block is generated.

According to another aspect of the present invention, there is provided a method of encoding a multi-view image. The method includes generating information indicating that at least one intra (I) picture for a plurality of views from among total views of the multi-view image is generated and the multi-view image is predictive-encoded based on the generated I pictures, and inserting the generated information into a bitstream for the multi-view image.

The generation of the information may include generating information about reference views referred to by each of the total views of the multi-view image for inter-view prediction, and the reference views may be determined according to a view at which each of the I pictures for each image processing block of the multi-view image is located.

According to another aspect of the present invention, there is provided an apparatus for encoding a multi-view image. The apparatus includes an information generation unit generating information indicating that at least one intra (I) picture for a plurality of views from among total views of the multi-view image is generated and the multi-view image is predictive-encoded based on the generated I pictures, and an information insertion unit inserting the generated information into a bitstream for the multi-view image According to another aspect of the present invention, there is provided a method of decoding a multi-view image. The method includes reconstructing an intra (I) picture of a current image processing block for a different view than a view at which an I picture of a previous image processing block is reconstructed, predicting a current picture based on at least one of the I picture of the previous image processing block and the I picture of the current image processing block, and reconstructing the current picture based on the prediction.

The predicting of the current picture may include predicting the current picture by performing temporal prediction or inter-view prediction based on at least one of the I picture of the previous image processing block and the I picture of the current image processing unit.

The inter-view prediction may be performed by referring to pictures at reference views referred to by a view including the current picture for the inter-view prediction according to information about reference views, which is inserted into a bitstream for the multi-view image, and the information about the reference views may be determined according to a view at which the I picture of the current image processing block is generated.

According to another aspect of the present invention, there is provided an apparatus for decoding a multi-view image. The apparatus includes a decoding unit receiving a bitstream including data about a current picture and extracting the data about the current picture from the received bitstream, an interprediction unit predicting the current picture based on at least one of an intra (I) picture of a previous image processing block and an I picture of a current image processing block, which is reconstructed at a different view than a view at which the I picture of the previous image processing block is reconstructed, and a reconstruction unit reconstructing the current picture based on the data about the current picture and the prediction.

According to another aspect of the present invention, there is provided a computer-readable recording medium having recorded thereon a program for executing the method of encoding a multi-view image and the method of decoding a multi-view image.

BRIEF DESCRIPTION OF THE DRAWINGS

The above aspects of the present invention will become more apparent by describing in detail exemplary embodiments thereof with reference to the attached drawings in which:

FIG. 1 illustrates image sequences of a multi-view image according to the related art;

FIG. 2 illustrates syntax of a sequence parameter of a multi-view image according to the related art;

FIG. 6 illustrates syntax of a slice parameter of a multi-view image according to an exemplary embodiment of the present invention;

FIG. 8A illustrates syntax of a sequence parameter of a multi-view image according to an exemplary embodiment of the present invention;

DETAILED DESCRIPTION OF THE EXEMPLARY EMBODIMENTS OF THE INVENTION

Figure 3:
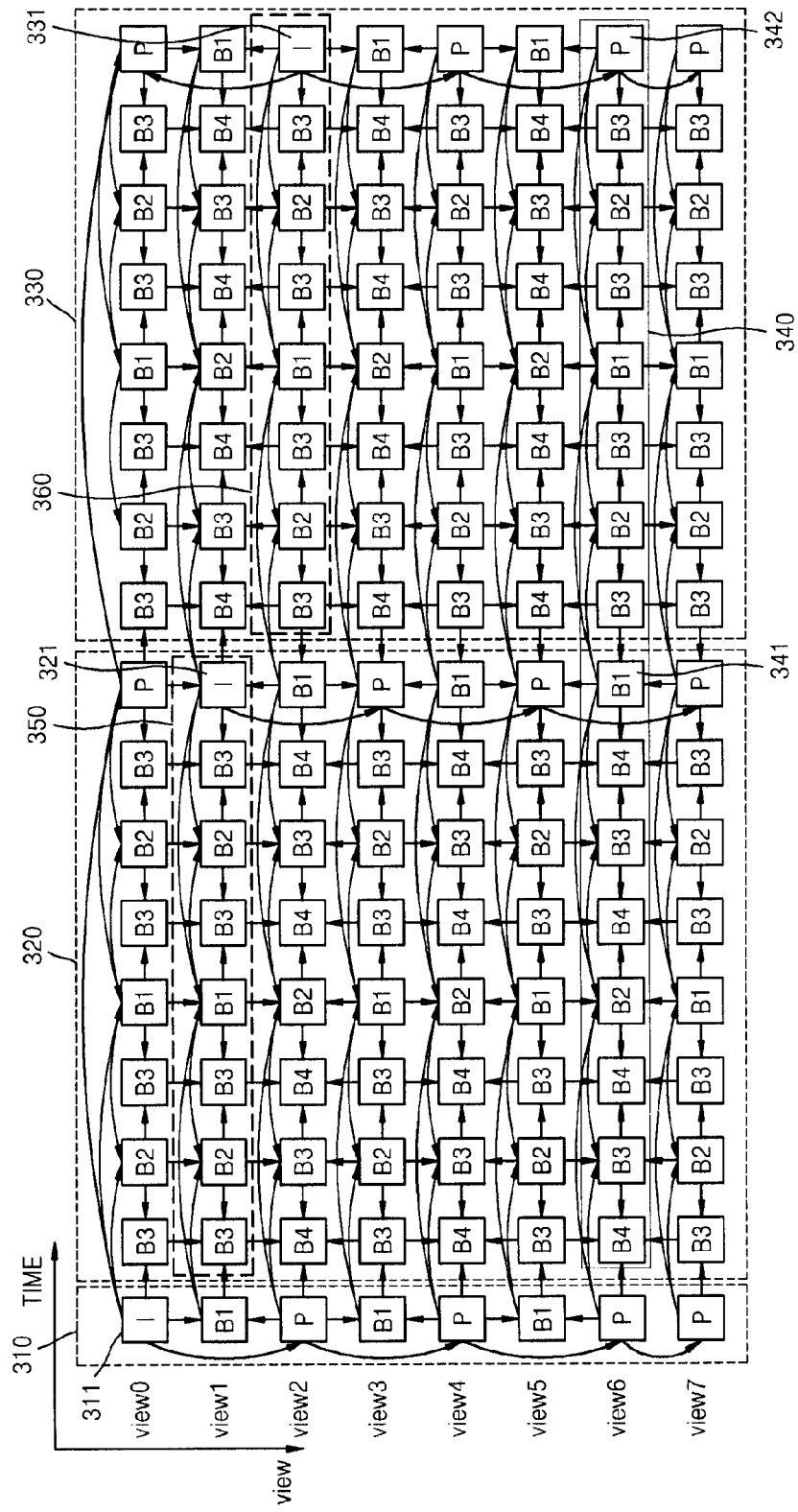
FIG. 3 illustrates image sequences of a multi-view image according to an exemplary embodiment of the present invention.

Hereinafter, exemplary embodiments of the present invention will be described in detail with reference to the accompanying drawings. It should be noticed that like reference numerals refer to like elements illustrated in one or more of the drawings. In the following, a detailed description of known functions and configurations incorporated herein will be omitted for conciseness and clarity.

FIG. 3 illustrates image sequences of a multi-view image according to an exemplary embodiment of the present invention. In FIG. 3, as in FIG. 1, a horizontal axis is a time axis and a vertical axis is a view axis. According to the related art, an intra (I) picture is periodically generated for an image at a base view and temporal prediction or inter-view prediction is performed based on generated I pictures, thereby predictive-encoding other pictures.

However, according to the exemplary embodiment of the present invention, an I picture is generated for images at views other than the base view, i.e., a view 0, and temporal prediction or inter-view prediction is performed based on the generated I picture, thereby predictive-encoding other pictures.

By generating an I picture for images at views other than the base view as well as an image at the base view, it is possible to prevent display quality degradation that may occur in the images at views other than the base view during predictive encoding.

Referring to FIG. 3, the apparatus according to an exemplary embodiment of the present invention encodes the multi-view image in predetermined image processing units. First, predictive-encoding is performed on initial pictures 310 at different views. The initial pictures 310 at different views are generated by performing inter-view prediction based on I pictures generated at reference views.

More specifically, predictive (P) pictures are generated for images at views 2, 4, 6, and 7 using unidirectional inter-view prediction, and bidirectionally predictive (B) pictures are generated for images at views 1, 3, and 5 using bidirectional inter-view prediction. The initial pictures 310 are predicted based on an I picture generated for the base view.

After prediction with respect to an initial image processing block, i.e., the initial pictures 310, is finished, prediction is performed on the next image processing block. In multi-view encoding, a group of successive picture from a picture that temporally immediately follows a previous I picture 311 to a current I picture 321 is referred to as a group of pictures (GOP) 350 and a block including GOPs at different views is known as a group of GOPs (GGOP). In FIG. 3, group of successive pictures from a picture that temporally immediately follows the current I picture 321 to a next I picture 331 is also a GOP 360. The apparatus according to an exemplary embodiment of the present invention performs predictive-encoding using a GGOP as an image processing block.

The apparatus according to an exemplary embodiment of the present invention generates the I picture 321 for an image at a different view than a base view 0 at which the I picture 311 is generated, e.g., an image at a view 1. In other words, the apparatus generates the I picture of the current image processing block 320 for an image at a different view than a view at which the I picture 311 of the previous image processing block 310 is generated. Similarly, an I picture 331 of the next image processing block 330 is generated for an image at a different view than a view at which the I picture 321 of the current image processing block 320 is generated, e.g., an image at the view 2.

Once the I picture 321 of the current image processing block 320 is generated, temporal prediction or inter-view prediction is performed based on the generated I picture 321 of the current image processing block 320 and the I picture 311 of the previous image processing block 310, thereby predictive-encoding the other pictures of the current image processing block 320. In other words, the other pictures are predictive-encoded by performing temporal prediction or inter-view prediction based on the I pictures. Temporal prediction or inter-view prediction may further be performed based on the predicted pictures.

Intervals at which an I picture is generated for an image at a different view than the base view are not limited, or an I picture may be non-periodically generated. Alternatively, I pictures may be generated for images only at a plurality of specific views, instead of for images at all views in a multi-view image. For example, I pictures may be generated for images at all views at an interval of a single GOP as illustrated in FIG. 3, but I pictures may also be non-periodically generated for images only at a plurality of particular views, i.e., views 0, 4, and 7.

When I pictures are generated for images at a plurality of views and the multi-view image is predictive-encoded based on the generated I pictures, the position of a reference view for inter-view prediction changes.

For example, referring to FIG. 1, a reference view for inter-view prediction of pictures included in an image sequence at a view 6 does not change.

Anchor pictures among total pictures included in the image sequence at the view 6 refer only to pictures at a view 4 and thus the reference view is the view 4. Non-anchor pictures from among the total pictures are referred to by pictures at other views without referring to any view. Such a characteristic is maintained without being changed for other image processing units.

However, referring to FIG. 3, in an image sequence 340 at the view 6, an anchor picture 341 included in the current image processing block 320 refers to a picture at the view 7 and non-anchor pictures included in the current image processing block 320 refer to pictures at the views 5 and 7 for inter-view prediction. However, an anchor picture 342 included in the next image processing block 330 refers to a picture at the view 4 and non-anchor pictures included in the next image processing block 330 are referred to by pictures at other views without referring to any view.

The reason why the position of a reference picture for inter-view prediction changes in a single image sequence is that the I pictures 321 and 331 included in different image processing units are generated for images at different views. Since the I picture 321 is generated for an image at the view 1 in the current image processing block 320 and the I picture 331 is generated for an image at the view 2 in the next image processing block 330, the position of a reference view referred to by the view 6 changes with a change in image processing block.

Thus, a method capable of encoding information about a reference view for each view, whose position changes with a view at which an I picture is generated, is required. Such a method suggested in the present invention will be described later in detail with reference to FIGS. 8A through 8C.

Figure 4:
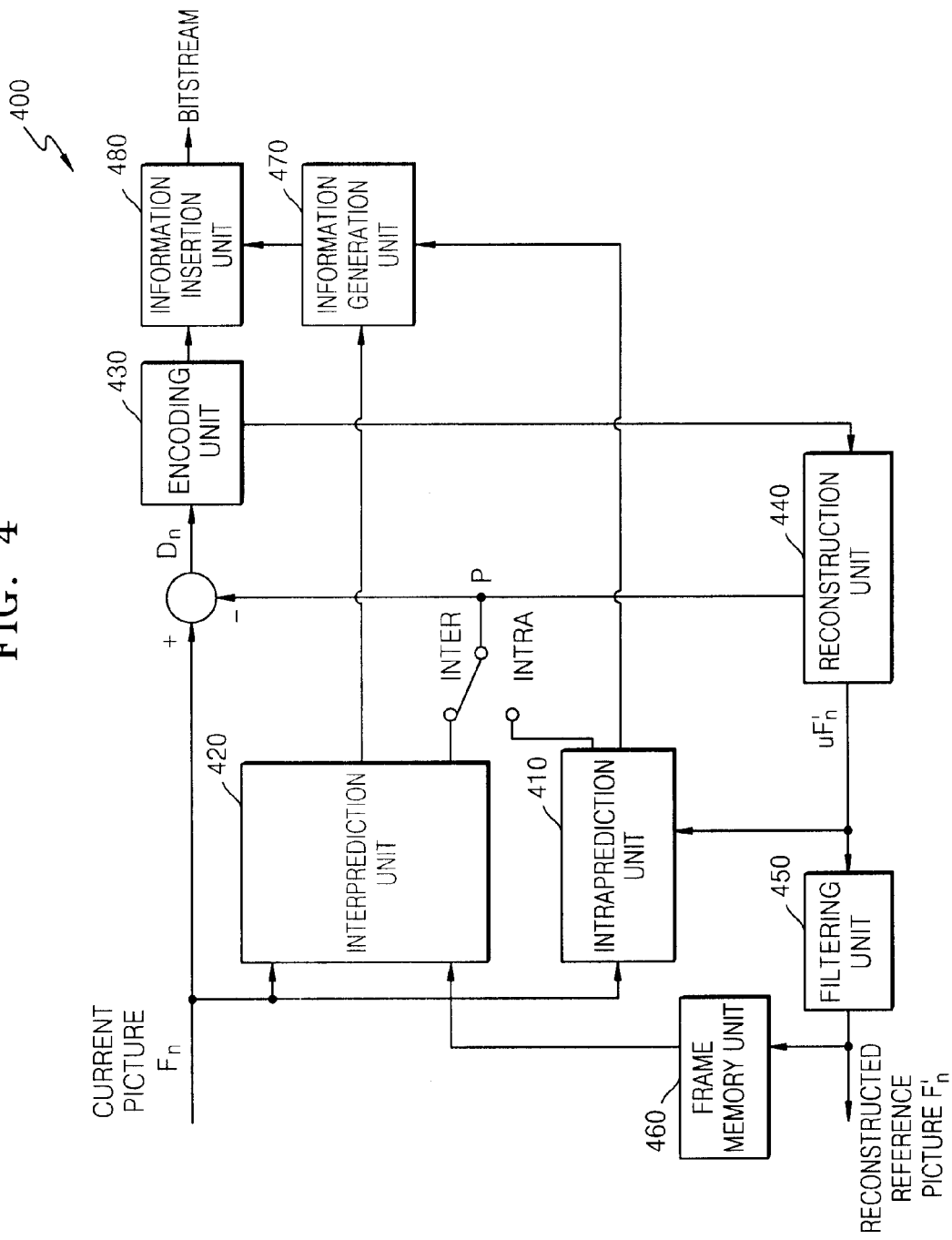
FIG. 4 is a block diagram of an apparatus for encoding a multi-view image according to an exemplary embodiment of the present invention.

FIG. 4 is a block diagram of an apparatus 400 for encoding a multi-view image according to an exemplary embodiment of the present invention.

Referring to FIG. 4, the apparatus 400 includes an intraprediction unit 410, an interprediction unit 420, an encoding unit 430, a reconstruction unit 440, a filtering unit 450, a frame memory unit 460, an information generation unit 470, and an information insertion unit 480.

In order to intrapredict an I picture of a current image processing block, the intraprediction unit 410 performs intra-prediction on an image at a different view than a view at which an I picture of a previous image processing block is generated. The apparatus 400 can generate I pictures for images at views other than a base view as illustrated in FIG. 3. Thus, the intraprediction unit 410 performs intraprediction on images at different views than a base view (view 0).

The generated intrapredicted image is subtracted from the original image, thereby generating a residue. The generated residue is encoded by the encoding unit 430 by discrete cosine transformation (DCT) and quantization. The encoded residue undergoes inverse quantization and inverse DCT and is then added to the intrapredicted image in the reconstruction unit 440, thereby reconstructing the I picture.

The reconstructed I picture is deblocking-filtered by the filtering unit 450 and is then stored in the frame memory unit 460 in order to be used for prediction of other pictures. The frame memory 460 stores the I picture of the previous image processing block as well as the I picture of the current image processing block, and the stored I pictures are referred to when the interprediction unit 420 performs temporal prediction or inter-view prediction.

The interprediction unit 420 predicts the current picture based on the I pictures stored in the frame memory unit 460. In other words, the interprediction unit 420 predicts the current picture based on at least one of the I picture of the previous image processing block and the I picture of the current image processing block, in which the I pictures are generated for images at different views. Here, each of the I pictures may be generated as an anchor picture in each of the current image processing block and the previous image processing block. Temporal prediction or inter-view prediction is performed based on the I pictures, thereby predicting the current picture.

As described above with reference to FIG. 3, in image sequences of a multi-view image according to an exemplary embodiment of the present invention, a reference view referred to by views for inter-view prediction is determined according to a view at which an I picture is generated in each image processing unit. Thus, the interprediction unit 420 first determines the position of a view at which an I picture is generated in the current image processing block, determines a reference view based on the determined position, and performs inter-view prediction by referring to pictures at the determined reference view.

The picture that is temporal-predicted or inter-view-predicted by the interprediction unit 420 is subtracted from the original picture in order to generate a residue and the generated residue is encoded by the encoding unit 430.

When the encoding unit 430 encodes the current picture, it also encodes information about a view at which an I picture is generated in the current image processing block. When the inter-view prediction encoded current picture is decoded, a decoding side has to know the position of a view at which an I picture is generated in the current image processing block. This is because the position of a reference view used for inter-view prediction changes with the position of a view at which an I picture is generated in the current image processing unit. Thus, information about a view at which an I picture of the current image processing block is generated is also encoded and transmitted for each picture.

The information generation unit 470 generates I pictures for images at a plurality of views from among all views of a multi-view image and generates information indicating that the multi-view image is predictive-encoded based on the generated I pictures.

As illustrated in FIG. 3, the information generation unit 470 generates I pictures for images at views other than a base view and generates information indicating that pictures of a multi-view image are predictive-encoded based on the generated I pictures.

The information generated by the information generation unit 470 also includes information about reference views referred to by each view for inter-view prediction.

Although the encoding unit 430 encodes information about a view at which an I picture of the current image processing block is generated for each picture, a decoding side cannot instantly specify a reference view referred to by the current picture for inter-view prediction. In other words, in addition to information about a view at which an I picture of the current image processing block is generated, information about reference views referred to by each view when the I picture is generated at the view has to be also transmitted to the decoding side.

Thus, the information generation unit 470 generates information about reference views referred to for inter-view prediction by each view that is determined according to the view at which the I picture is generated. A way to generate information about reference views will be described later in detail with reference to FIGS. 7 through 8C.

The information insertion unit 480 inserts information generated by the information generation unit 470 into a bitstream. A sequence parameter including the information generated by the information generation unit 470 is generated and is inserted into the bitstream.

Figure 5:
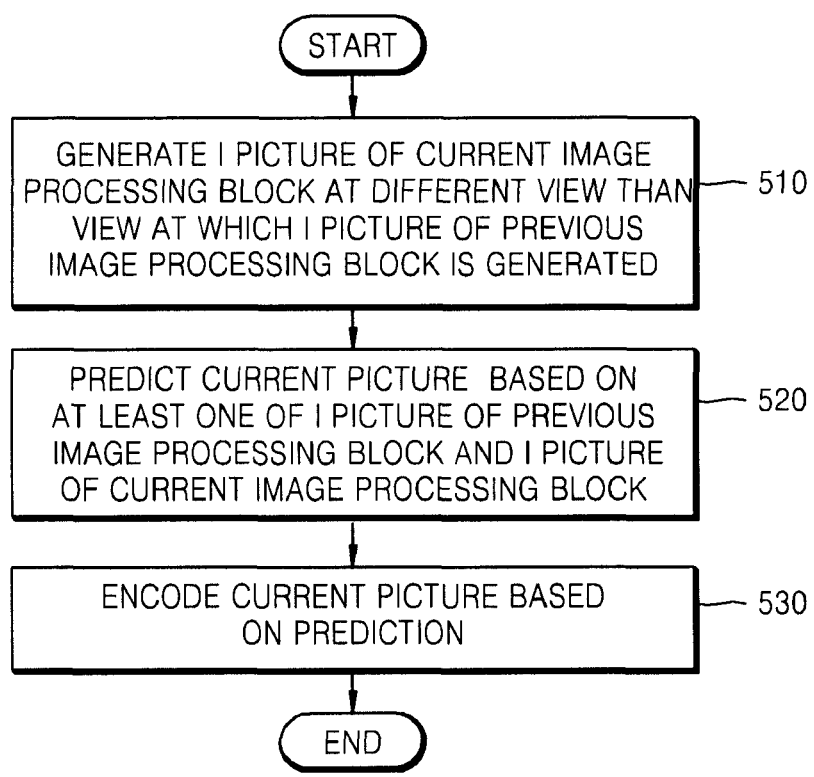
FIG. 5 is a flowchart of a method of encoding a multi-view image according to an exemplary embodiment of the present invention.

FIG. 5 is a flowchart of a method of encoding a multi-view image according to an exemplary embodiment of the present invention.

In operation 510, the apparatus for encoding a multi-view image according to the exemplary embodiment of the present invention generates an I picture 321 for a current image processing block at a different view than a view at which an I picture 311 for a previous image processing block is generated. If an I picture is generated for an image only at a base view, i.e., a view 0, and pictures at views other than the view 0 are predictive-encoded, display quality degradation may occur in images at the views other than the view 0. For this reason, I pictures are generated for images at views other than the base view and pictures of the multi-view image are predictive-encoded based on the generated I pictures.

In operation 520, the apparatus predicts the current picture based on at least one of the I picture of the current image processing block, which is generated in operation 510, and a previously generated I picture of the previous image processing block. Prediction may be performed using one or both of the two I pictures. The current picture is predicted using temporal prediction or inter-view prediction.

In operation 530, the apparatus encodes the current picture based on the prediction of operation 520. More specifically, a prediction value for the current picture obtained in operation 520 is subtracted from the original value, thereby generating a residue, and the generated residue is encoded.

In order to provide information about reference views referred to by the current picture for inter-view prediction to a decoding side, information about a view, at which there is an I picture for the current image processing block, is also encoded, and will now be described with reference to FIG. 6.

FIG. 6 illustrates syntax of a slice parameter of a multi-view image according to an exemplary embodiment of the present invention.

Referring to FIG. 6, a slice parameter according to the exemplary embodiment of the present invention includes information about a view at which an I picture of the current image processing block is generated in addition to a related art slice parameter.

In FIG. 6, 'I_frame_position' is information about a view at which an I picture is generated. Information about a view at which an I picture is generated is encoded as a parameter and is transmitted for the current picture or for each slice, so as to allow the decoding side to refer to the information.

Figure 7:
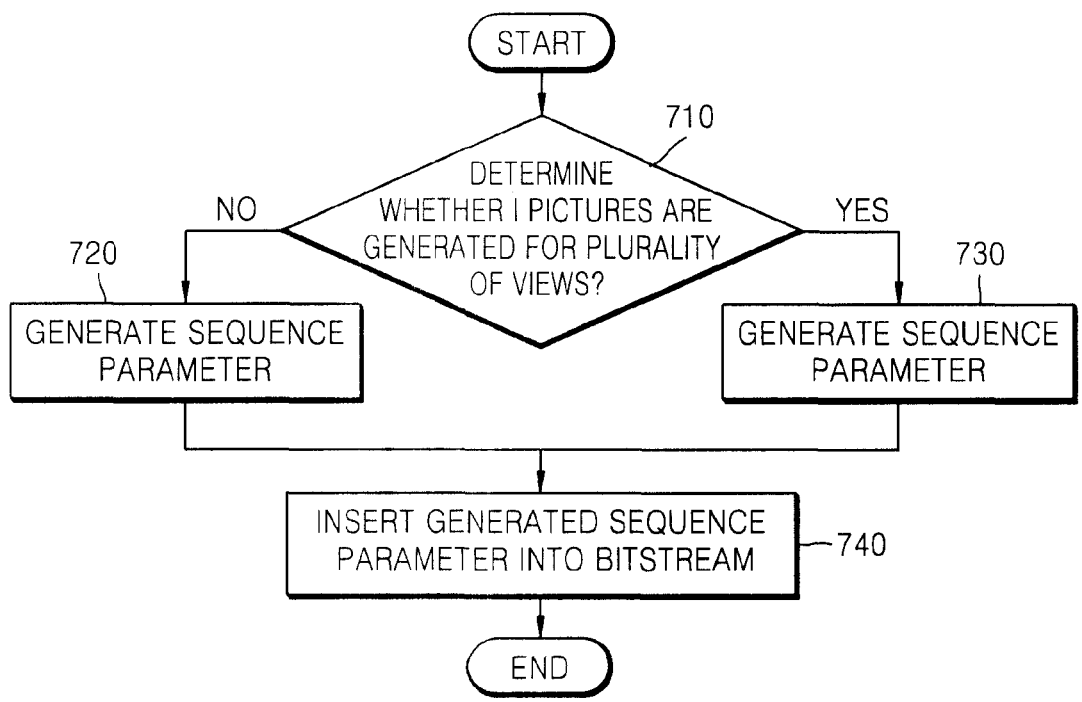
FIG. 7 is a flowchart of a process of generating a sequence parameter of a multi-view image according to an exemplary embodiment of the present invention.

FIG. 7 is a flowchart of a process of generating a sequence parameter of a multi-view image according to an exemplary embodiment of the present invention. As mentioned above, even when information about a view at which the I picture of the current image processing block is encoded and transmitted for each picture of the multi-view image, the decoding side cannot instantly specify a reference view referred to by the current picture for inter-view prediction. Thus, a sequence parameter specifying a reference view determined according to a view at which the I picture of the current image processing block is generated has to be separately encoded and transmitted to a decoding side.

Referring to FIG. 7, in operation 710, the apparatus for encoding a multi-view image determines whether I pictures are generated for images at a plurality of views and the I pictures are predictive-encoded based on the generated I pictures.

In other words, it is determined whether I pictures are periodically or non-periodically generated for a plurality of views instead of periodically generating an I picture for a base view like in the related art.

In operations 720 and 730, information indicating that at least one or more I pictures are generated for a plurality of views and that the multi-view image is predictive-encoded based on the generated I pictures according to the exemplary embodiment present invention is generated. The generated information includes information about reference views referred to by each view for inter-view prediction.

If it is determined that the I pictures are not generated for the plurality of views in operation 710, a sequence parameter of the multi-view image corresponding to I pictures that are not generated for the plurality of views is generated in operation 720.

As in the sequence parameter illustrated in FIG. 2, the information about reference views is generated separately for anchor pictures and non-anchor pictures at each view. However, according to an exemplary embodiment of the present invention, as illustrated in FIG. 8A, even when the I pictures are not generated for the plurality of views, 'flexible_I_frame_position_flag' is set in order to indicate whether the I pictures are generated for the plurality of views. For example, 'flexible_I_frame_position_flag' is set to '1' when the I pictures are generated for the plurality of views, and 'flexible_I_frame_position_flag' is set to '0' when the I picture is generated only for the base view as in operation 420.

Moreover, according to an exemplary embodiment of the present invention, a view difference, instead of a view number, is used to generate the information about reference views. By setting and encoding the information about reference views using a view difference from each view to its reference view, compression efficiency in terms of encoding a sequence parameter can be improved.

In order to directly use a view number, a large amount of bits may be required in order to encode a large view number such as a view 7. However, by setting a sequence parameter using a view difference between each view and its reference view, the sequence parameter can be encoded into a small amount of bits.

If it is determined that the I pictures are generated for the plurality of views in operation 710, the sequence parameter of the multi-view image corresponding to I pictures generated for the plurality of views is generated in operation 730.

As described in operation 720, 'flexible_I_frame_position_flag' is set in order to indicate that the I pictures are generated for the plurality of views. Next, information about reference views referred to by each view of the multi-view image according to each of the I pictures is generated.

In operation 740, the apparatus inserts the sequence parameter generated in operation 720 or 730 into a bitstream.

FIG. 8A illustrates syntax of a sequence parameter of a multi-view image according to an exemplary embodiment of the present invention.

Referring to FIG. 8A, a parameter indicating the number of views of the multi-view image, i.e., 'num_views_minus_1', is set first. Since view numbers start from 0, 'num_views_minus_1' indicating a number obtained by subtracting 1 from a view number is the last view number. In order to indicate that the I pictures are generated for the plurality of views, 'flexible_I_frame_position_flag' is determined.

Once 'flexible_I_frame_position_flag' is determined, 'diff_view_idc' indicating information about a view difference is determined, as will now be described with reference to FIG. 8B.

Figures 8B, 8C:
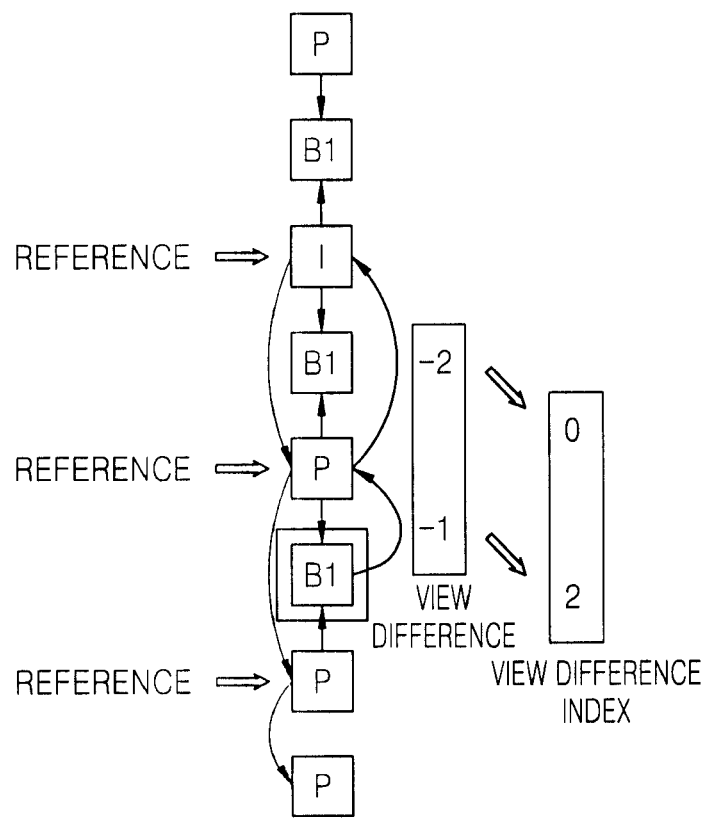
FIG. 8B illustrates a view difference index according to an exemplary embodiment of the present invention.
FIG. 8C illustrates the generation of information about reference views according to an exemplary embodiment of the present invention.

FIG. 8B illustrates a view difference index according to an exemplary embodiment of the present invention.

Referring to FIG. 3, in the image sequence 340 at the view 6, the anchor picture 341 included in the current image processing block 320 refers to the view 7 and the non-anchor pictures included in the current image processing block 320 refers to the views 5 and 7 for inter-view prediction.

In this case, a view difference from the view 6 to the view 5 is −1 and a view difference from the view 6 to the view 7 is +1. If the view 6 refers to the view 4 for inter-view prediction, a view difference from the view 6 to the view 4 is −2.

Preferably, but not necessarily all possible view differences may be used after being indexed, as will be described below with reference to FIG. 8B.

Thus, if 'diff_view_idc' is set as illustrated in FIG. 8B, 'diff_view_idc' is only an index indicating a view difference and respectively corresponds to each actual view difference such as −2, +2, −1, or +1.

Referring back to FIG. 8A, after view difference indices are set up, information about reference views is generated according to 'frame_I_frame_position_flag'. If 'flexible_I_frame_position_flag' is 0, i.e., indicates that I pictures are not generated for a plurality of views, information about reference views of 'list0' and information about reference views of 'list1' are generated separately for anchor pictures and non-anchor pictures.

As in FIG. 2, 'list0' is a list of reference views whose numbers are less than the current view number from among all reference views referred to by the current view, and 'list1' is a list of reference views whose numbers are greater than the current view number from among all the reference views. In this case, information about reference views may be generated by indexing a view difference using the view difference index 'diff_view_idc' illustrated in FIG. 8B. FIG. 8A illustrates syntax of a sequence parameter when information about reference views is generated after a view difference is indexed.

Since the position of an I picture is fixed to a base view, a reference view referred to by each view does not change over the entire image sequence. Thus, information about the number of reference views of 'list0' and information about the number of reference views of 'list1' are determined for each view. 'num_diff_view_idc_multiview_refs_for_list0[$i$]', which indicates the number of reference views of 'list0', is determined and 'num_diff_view_idc_multiview_refs_for_list1[$i$]', which indicates the number of reference views of 'list1', is determined. Next, information about reference views of 'list0' and reference views of 'list1' is determined separately for anchor pictures and non-anchor pictures.

More specifically, using a view difference index, 'diff_view_idc_anchor_reference_for_list_0[i][j]', which indicates information about reference views of 'list0', which are referred to by an anchor picture, is set and 'diff_view_idc_non_anchor_reference_for_list0[i][j]', which indicates information about reference views of 'list0', which are referred to by a non-anchor picture, is set.

Likewise, using a view difference index, 'diff_view_idc_anchor_reference_for_list_1[i][j]', which indicates information about reference views of 'list1', which are referred to by an anchor picture, is set and 'diff_view_idc_non_anchor_reference_for_list_1[i][j]', which indicates information about reference views of 'list1', which are referred to by a non-anchor picture, is set.

If 'flexible_I_frame_position_flag' is 1, i.e., I pictures are generated for a plurality of views, the position of a reference view referred to by each view changes according to the position of a view at which an I picture is generated. Thus, information about reference views has to be set for each view according to a view at which the I picture of the current image processing block is generated.

First, when an I picture is generated at a view 0, i.e., for i=0, information about the number of reference views of 'list0' and information about reference views of 'list1' are generated for each view. 'num_diff_view_idc_multiview_anchor_refs_for_list0[i][j]' is information about the number of reference views of 'list0', which are referred to by an anchor picture, and 'num_diff_view_idc_multiview_non_anchor_refs_for_list0[i][j]' is information about the number of reference views of 'list0', which are referred to by a non-anchor picture. 'num_diff_view_idc_multiview_anchor_refs_for_list1[i][j]' is information about the number of reference views of 'list 1', which are referred to by an anchor picture, and 'num_diff_view_idc_multiview_non_anchor_refs_for_list1[i][j]' is information about the number of reference views of 'list1', which are referred to by a non-anchor picture.

Once information about the number of reference views is set, information about reference views referred to by an anchor picture and reference views referred to by a non-anchor picture is set using a view difference index. The information about the reference views of 'list0', which are referred to by an anchor picture, is set to 'diff_view_idc_anchor_reference_for_list0[i][j][k]' by using a view difference index, and the information about the reference views of 'list0', which are referred to by a non-anchor picture, is set to 'diff_view_idc_non_anchor_reference_for_list_0[i][j][k]' by using a view difference index. Likewise, the information about the reference views of 'list1', which are referred to by an anchor picture, is set to 'diff_view_idc_anchor_reference_for_list1[i][j][k]' by using a view difference index, and the information about the reference views of 'list1', which are referred to by a non-anchor picture, is set to 'diff_view_idc_non_anchor_reference_for_list1[i][j][k]' by using a view difference index.

By applying a process of setting syntaxes, which is performed when the I picture is generated at the view 0, to cases where the I picture is generated at the view 1, at the view 2, and at the view 3, and so on, the generation of information about reference views according to a view, at which the I picture of the current image processing block is generated, is completed.

FIG. 8C illustrates the generation of information about reference views according to an exemplary embodiment of the present invention. Information about reference views referred to by the view 5 in the next image processing block 330 illustrated in FIG. 3 will be taken as an example.

In FIG. 8C, the generation of information about reference views referred to by the view 5 for inter-view prediction is taken as an example. The B picture refers to the P picture at the view 4 for inter-view prediction. To this end, the B picture has to also refer to the I picture at the view 2 and the P picture at the view 6. The position of a view at which an I picture is generated in the current image processing block is the view 2, and thus i=2.

As a result, reference views of 'list0', which are referred to by the B picture, are the view 4 and the view 2, a view difference between the view 5 and the view 4 is −1, and a view difference from the view 4 to the view 2 is −2. When those view differences are compared with view difference indices illustrated in FIG. 8B, a view difference of −1 corresponds to 'diff_view_idc=2' and a view difference of −2 corresponds to 'diff_view_idc=0'.

Thus, 'num_diff_view_idc_multiview_anchor_refs_for_list0[2][5]' is 2, 'diff_view_idc_anchor_reference_for_list0[2][5][0]' is 2, and 'diff_view_idc_anchor_reference_for_list0[2][5][1]' is 0.

A reference view of 'list1', which is referred to by the B picture, is the view 6, and thus a view difference between the view 5 and the view 6 is +1 and 'diff_view_idc' is 3. Therefore, 'num_diff_view_idc_multiview_anchor_refs_for_list1[2][5]' is 1 and 'diff_view_idc_anchor_reference_for_list_1[2][5][0]' is 3.

Figure 9:
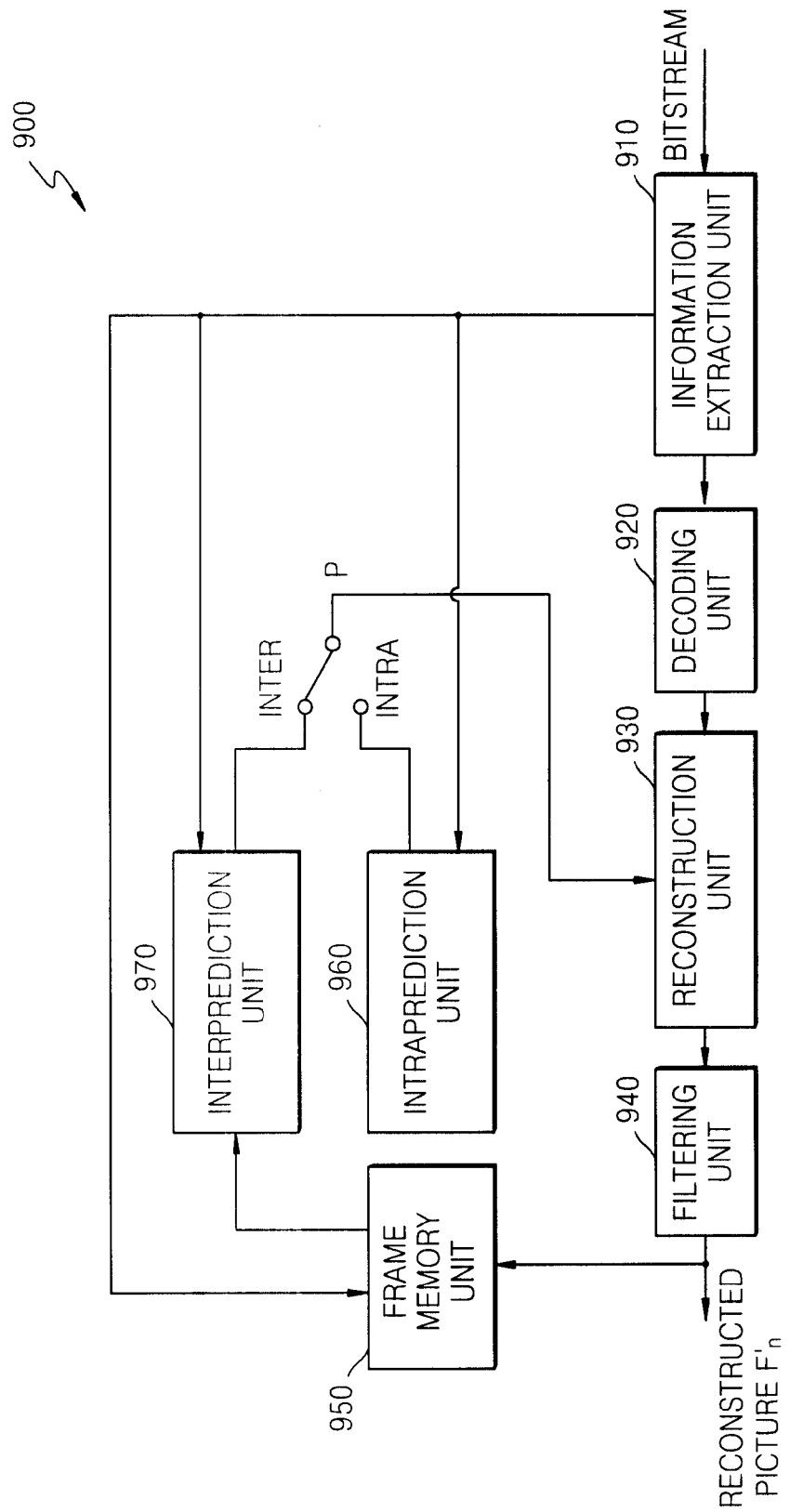
FIG. 9 is a block diagram of an apparatus for decoding a multi-view image according to an exemplary embodiment of the present invention.

FIG. 9 is a block diagram of an apparatus 900 for decoding a multi-view image according to an exemplary embodiment of the present invention.

Referring to FIG. 9, the apparatus 900 includes an information extraction unit 910, a decoding unit 920, a reconstruction unit 930, a filtering unit 940, a frame memory unit 950, an intraprediction unit 960, and an interprediction unit 970.

The information extraction unit 910 extracts information about reference views from a received bitstream. According to an exemplary embodiment the present invention, the position of a reference view referred to by each view for inter-view prediction changes with the position of a view at which an I picture is generated in an image processing block, i.e., a GGOP. Thus, a sequence parameter, including information about reference views determined according to a view at which the I picture of the current image processing block is generated, is extracted from the bitstream.

The intraprediction unit 960 generates I pictures for images at different views based on the information about reference views, extracted by the information extraction unit 910. If it is determined that I pictures are generated for a plurality of views and a multi-view image is predictive-encoded based on the generated I pictures according to the extracted information, the intraprediction unit 960 performs intraprediction for the different views, thereby reconstructing the I pictures. To this end, the intraprediction unit 960 refers to 'flexible_I_frame_position_flag' of a parameter. Preferably, the intraprediction unit 960 predicts I pictures as anchor pictures.

The frame memory unit 950 stores pictures used by the interprediction unit 970 for temporal prediction or inter-view prediction. Pictures referred to by the current picture for inter-view prediction are determined according to the information about reference views, extracted by the information extraction unit 910. Thus, a reference view is specified according to the extracted information and pictures at the specified reference view are stored in order to be used by the interprediction unit 970 for inter-view prediction.

Since the frame memory unit 950 stores only the pictures at the reference view specified by the extracted information, the multi-view image can be efficiently predictive-encoded with the frame memory 950 having a small capacity.

The interprediction unit 970 performs temporal prediction or inter-view prediction on the current picture by referring to the pictures stored in the frame memory unit 950. In particular, the interprediction unit 970 performs inter-view prediction by referring to the pictures at the reference view specified according to the extracted information. When an I picture of the current image processing block and an I picture of the previous image processing block are generated at different views, temporal or inter-view prediction is performed based on the I pictures, thereby predicting the current picture.

An image predicted by the intraprediction unit 960 and the interprediction unit 970 is transmitted to the reconstruction unit 930. The reconstruction unit 930 reconstructs the current picture using data about the current picture, extracted by the encoding unit 920, i.e., data about a residue, and the predicted image. The predicted image is added to an inversely quantized and inversely discrete cosine transformed residue. The reconstructed current picture is deblocking-filtered by the filtering unit 940 and then stored in the frame memory unit 950 for prediction of another picture.

Figure 10:
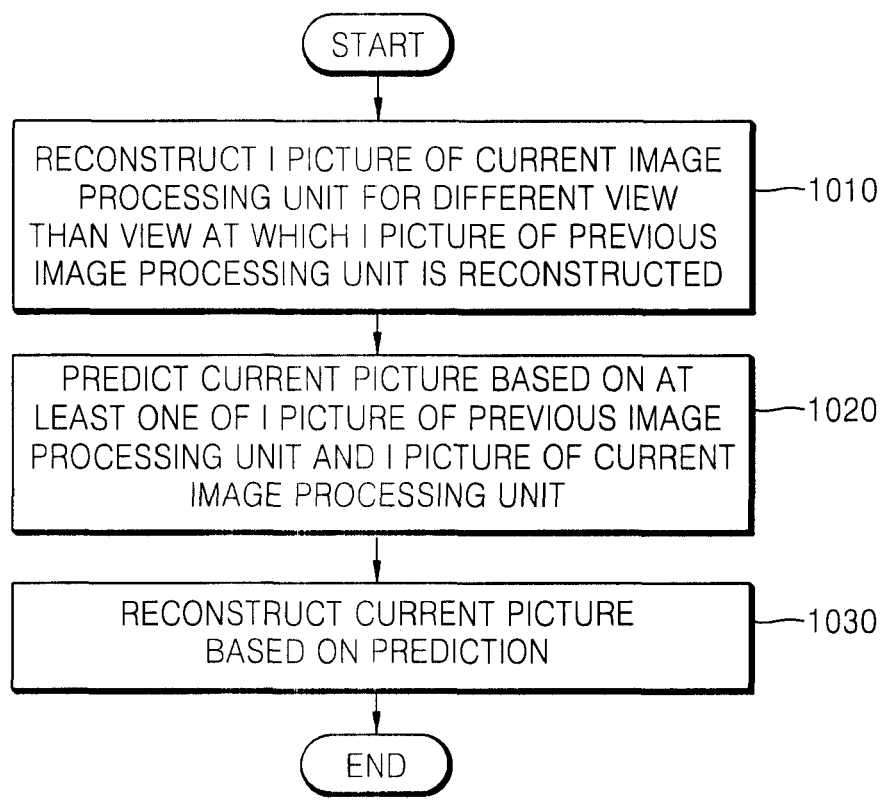
FIG. 10 is a flowchart of a method of decoding a multi-view image according to an exemplary embodiment of the present invention.

FIG. 10 is a flowchart of a method of decoding a multi-view image according to an exemplary embodiment of the present invention.

In operation 1010, the apparatus for decoding a multi-view image according to the exemplary embodiment of the present invention reconstructs an I picture of the current image processing block for a different view than a view at which an I picture of a previous image processing block is generated. The reconstructed I pictures are generally anchor pictures and the image processing block is a GGOP.

In operation 1020, the apparatus predicts the current picture based on the I picture of the current image processing block, reconstructed in operation 1010, and the I picture of the previous image processing unit. By performing temporal prediction or inter-view prediction based on the I pictures, the current picture is predicted. By further performing temporal prediction or inter-view prediction based on other pictures predicted based on I pictures, the current picture may also be predicted.

Inter-view prediction may be performed by referring to information about reference views, included in a sequence parameter of a bitstream. According to the present invention, the position of a reference view changes with the position of an I picture in an image processing unit. Thus, a view at which the I picture of the current image processing block is generated is determined and a reference view is specified based on the determined view. Thereafter, inter-view prediction is performed by referring to pictures at the specified reference view.

In operation 1030, the apparatus reconstructs the current picture based on the prediction performed in operation 1020. Data about the residue for the current picture is extracted from the bitstream and the extracted data is added to the predicted image, thereby reconstructing the current picture.

The I picture, the P picture, and the B picture are used for convenience of explanation. Thus, it would be easily understood by those of ordinary skill in the art that the present invention may also be applied to a slice block, i.e., an I slice, a P slice, and a B slice.

As described above, according to the present invention, an I picture is generated for an image at a different view than a base view and a multi-view image is predictive-encoded based on the generated I picture, thereby preventing display quality degradation that may occur in the image at the different view than the base view.

When I pictures are generated for images at different views, information about reference views referred to by each of the views for inter-view prediction can be transmitted by using a sequence parameter, thereby allowing a decoding side to efficiently perform decoding.

A system according to an exemplary embodiment of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The computer readable recording medium can also be distributed over network coupled computer systems so that the computer readable code is stored and executed in a distributed fashion.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of encoding a multi-view image, the method comprising:
   generating an intra (I) picture of a first image processing block for a different view than a view at which an I picture of a second image processing block is generated;
   predicting a first picture based on at least one of the I picture of the second image processing block and the I picture of the first image processing block; and
   encoding the first picture based on the prediction.

2. The method of claim 1, wherein the I pictures are anchor pictures at different times.

3. The method of claim 1, wherein the predicting the first picture comprises predicting the first picture by performing temporal prediction or inter-view prediction based on at least one of the I picture of the second image processing block and the I picture of the first image processing block.

4. The method of claim 3, wherein the inter-view prediction is performed by referring to pictures at reference views referred to by a first view including the first picture for the inter-view prediction,
   wherein the reference views are determined according to a second view at which the I picture of the first image processing block is generated.

5. An apparatus for encoding a multi-view image, the apparatus comprising:
   an interprediction unit which predicts a first picture based on at least one of an intra (I) picture of a second image processing block and an I picture of a second image processing block, which is generated for a different view than a view at which the I picture of the second image processing block is generated; and
   an encoding unit which encodes a current picture based on the predictions.

6. The apparatus of claim 5, wherein the I pictures are anchor pictures at different times.

7. The apparatus of claim 5, wherein the interprediction unit predicts the first picture by performing at least one of temporal prediction and inter-view prediction based on at least one of the I picture of the second image processing block and the I picture of the first image processing unit.

8. The apparatus of claim 7, wherein the inter-view prediction is performed by referring to pictures at reference views referred to by a view including the first picture for the inter-view prediction, and wherein the reference views are determined according to a view at which the I picture of the first image processing unit is generated.

9. A method of encoding a multi-view image, the method comprising:

generating information indicating that at least one intra (I) picture for a plurality of views from among total views of the multi-view image is generated and the multi-view image is predictive-encoded based on the generated I pictures; and inserting the generated information into a bitstream for the multi-view image.

10. The method of claim 9, wherein the generating the information comprises generating information about reference views referred to by each of the total views of the multi-view image for inter-view prediction, and the reference views are determined according to a view at which each of the I pictures for each image processing unit of the multi-view image is located.

11. The method of claim 9, wherein the information about the reference views includes at least one of (a) information about a reference view referred to by an anchor picture included in each of the total views and a reference view referred to by a non-anchor picture included in each of the total views and (b) information about a view difference between each of the total views and its reference view.

12. The method of claim 9, wherein the inserting the generated information comprises inserting a sequence parameter including the information about the reference views for the multi-view image into the bitstream.

13. A method of decoding a multi-view image, the method comprising:

reconstructing an intra (I) picture of a first image processing block for a different view than a view at which an I picture of a second image processing block is reconstructed;

predicting a first picture based on at least one of the I picture of the second image processing block and the I picture of the first image processing block; and reconstructing the first picture based on the prediction.

14. The method of claim 13, wherein the I pictures are anchor pictures at different times.

15. The method of claim 13, wherein the predicting a current picture comprises predicting the first picture by performing at least one of temporal prediction and inter-view prediction based on at least one of the I picture of the second image processing unit and the I picture of the first image processing unit.

16. The method of claim 15, wherein the inter-view prediction is performed by referring to pictures at reference views referred to by a view including the current picture for the inter-view prediction according to information about reference views, which is inserted into a bitstream for the multi-view image, the information about the reference views is determined according to a view at which the I picture of a current image processing unit is generated, and the information about the reference views is inserted into the bitstream for the multi-view image as a sequence parameter.

17. An apparatus for decoding a multi-view image, the apparatus comprising:

a decoding unit which receives a bitstream including data about a first picture and extracts the data about the first picture from the received bitstream;

an interprediction unit which predicts the first picture based on at least one of an intra (I) picture of a first image processing block and an I picture of a second image processing block, which is reconstructed at a different view than a view at which the I picture of the first image processing block is reconstructed; and a reconstruction unit reconstructing the first picture based on the data about the first picture and the prediction.

18. The apparatus of claim 17, wherein the interprediction unit predicts the first picture by performing at least one of temporal prediction and inter-view prediction based on at least one of the I picture of the first image processing block and the I picture of the second image processing block, wherein the I pictures are anchor pictures at different times.

19. The apparatus of claim 18, wherein the inter-view prediction is performed by referring to pictures at reference views referred to by a view including the first picture for the inter-view prediction according to information about reference views, which is inserted into the bitstream for the multi-view image, and the information about the reference views is determined according to a view at which the I picture of the second image processing block is generated and the information about the reference views is inserted into the bitstream for the multi-view image as a sequence parameter.

* * * * *